May 10, 1938.    N. A. LUDINGTON    2,117,068
TRANSPORTATION MEANS
Original Filed March 10, 1934    5 Sheets-Sheet 3
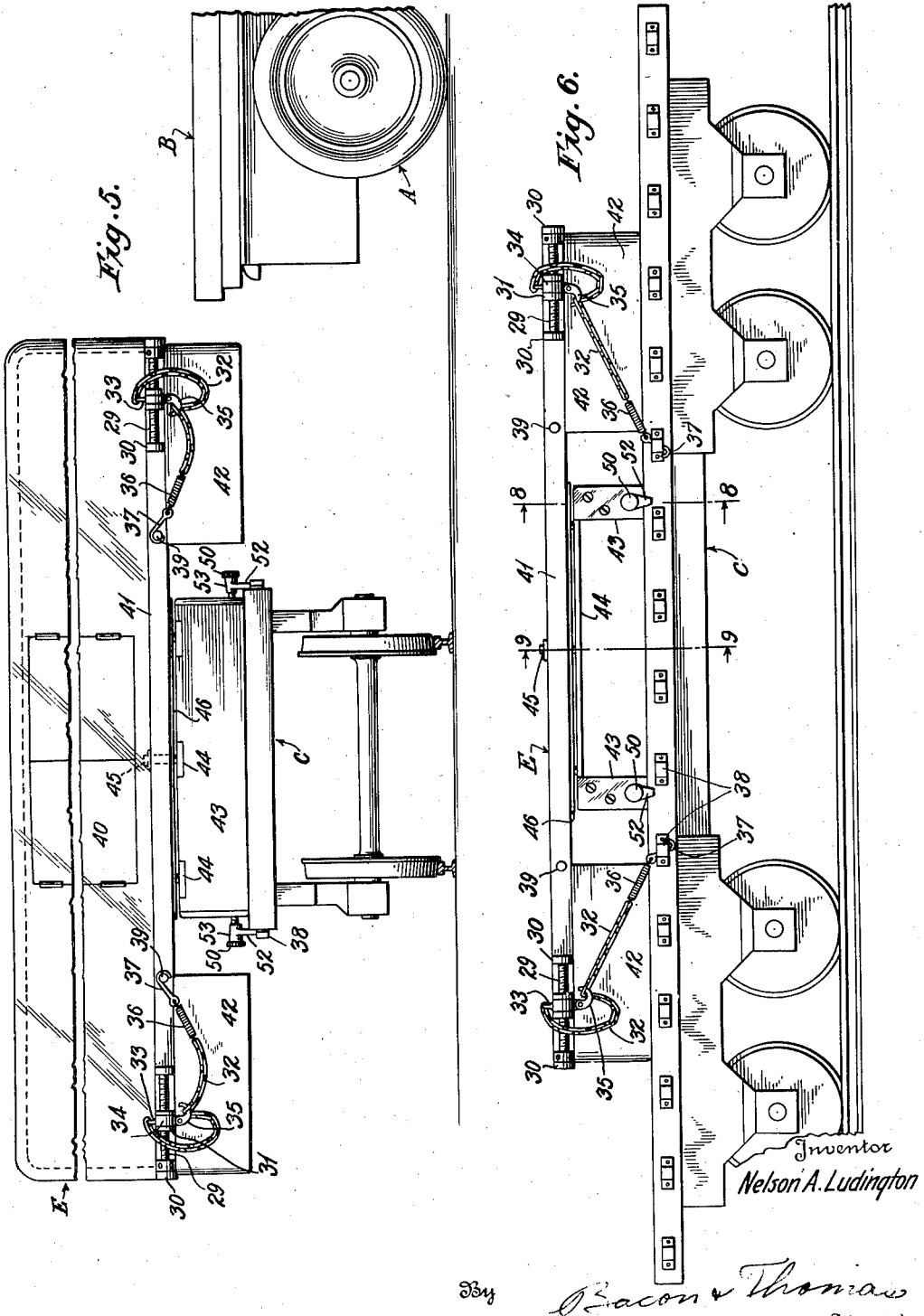

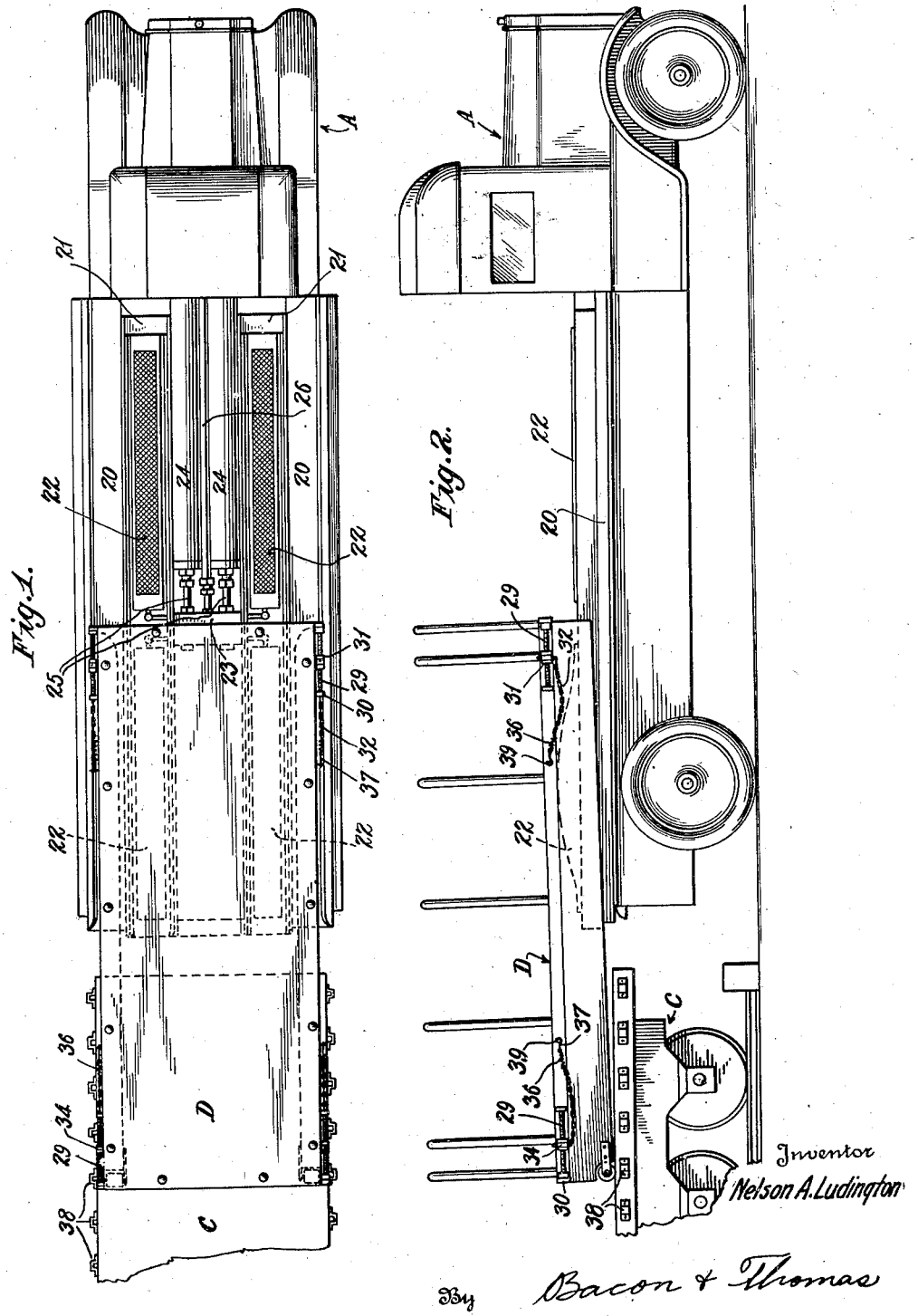

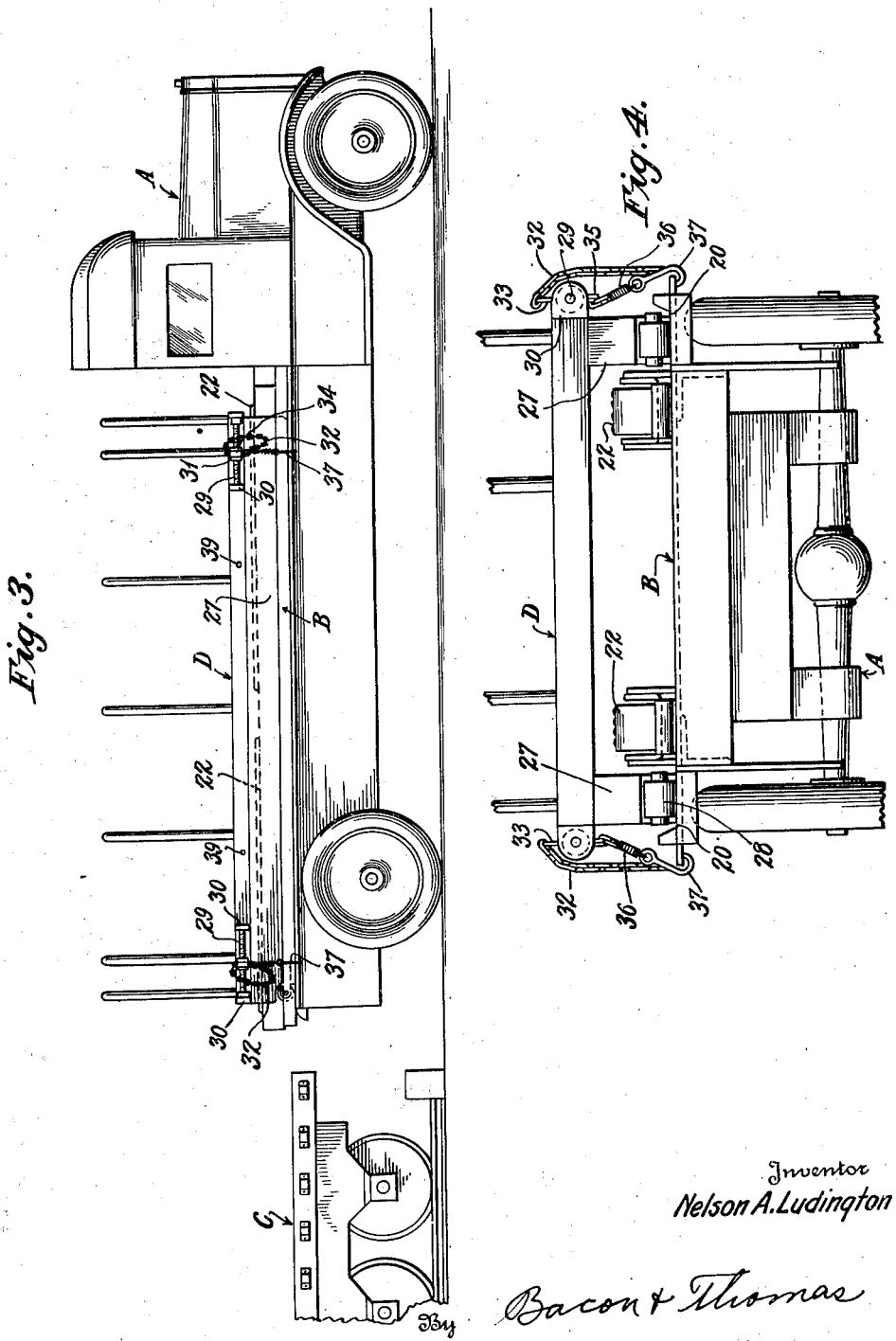

May 10, 1938.    N. A. LUDINGTON    2,117,068
TRANSPORTATION MEANS
Original Filed March 10, 1934    5 Sheets-Sheet 4
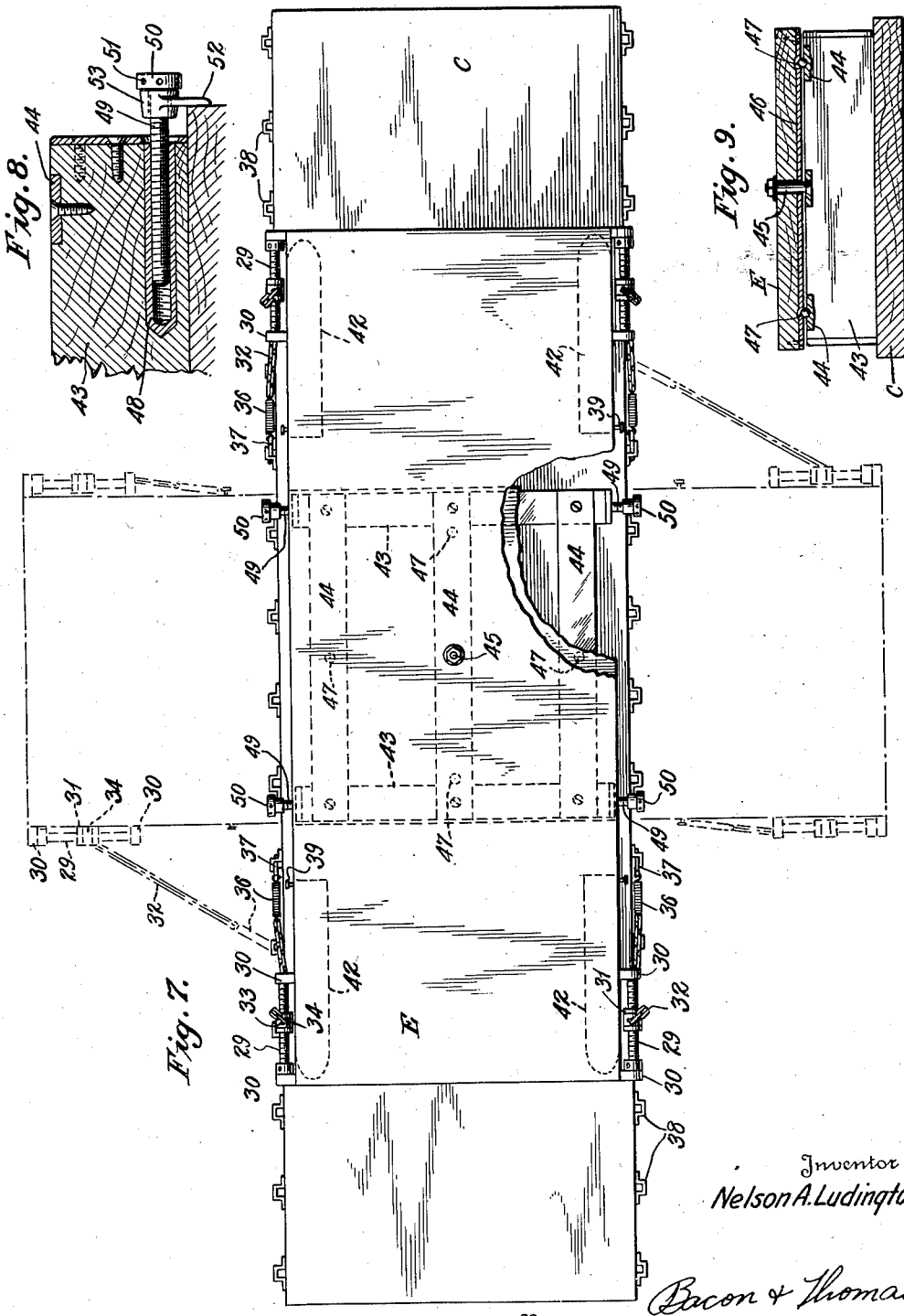

May 10, 1938. N. A. LUDINGTON 2,117,068
TRANSPORTATION MEANS
Original Filed March 10, 1934 5 Sheets-Sheet 5
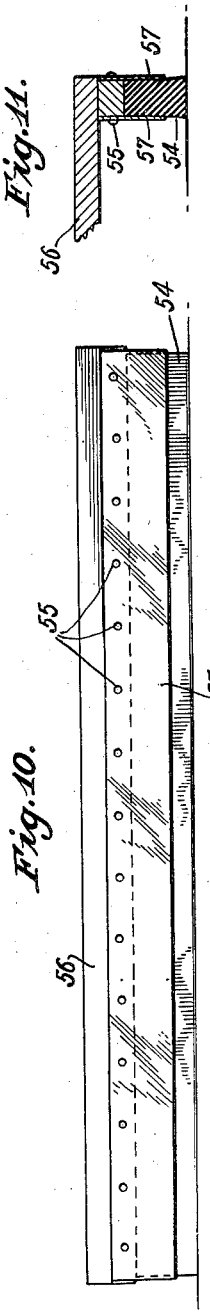
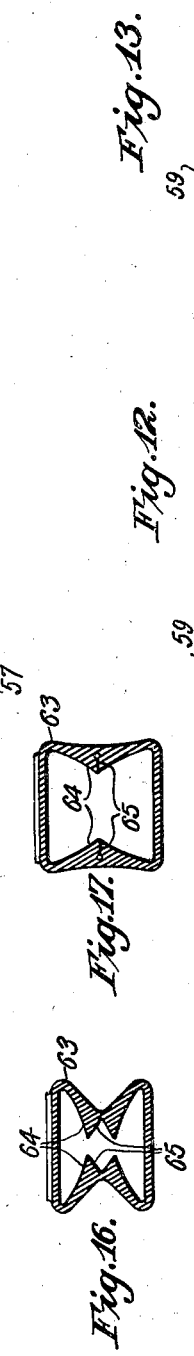
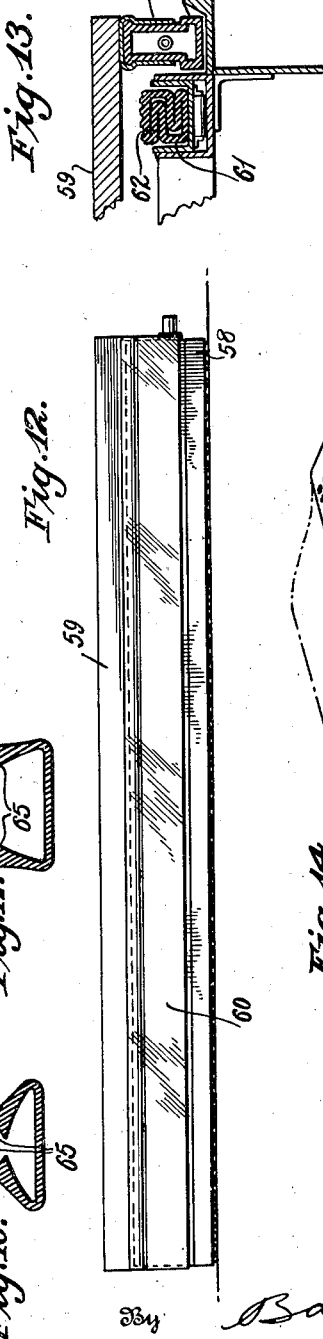
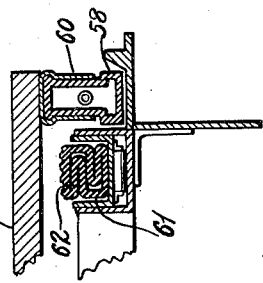
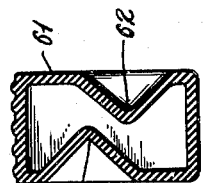
Inventor
Nelson A. Ludington
By Bacon & Thomas
Attorneys Patented May 10, 1938

2,117,068

UNITED STATES PATENT OFFICE 2,117,068

TRANSPORTATION MEANS

Nelson A. Ludington, New Haven, Conn.

Application March 10, 1934, Serial No. 715,013
Renewed October 7, 1937

16 Claims. (Cl. 214—65)

This invention relates to new and useful improvements in transportation means.

In my Patent No. 1,910,398, issued May 23, 1933, and in my application Serial No. 674,785, filed June 8, 1933, I have disclosed and claimed transportation means especially designed for handling L. C. L. containers of a size which will permit two or more of the same to be placed upon a conventionally sized five ton truck body or of a size which will permit six or eight of the said containers or load boxes to be arranged on a railway flat car. The said patent and application also disclose a mobile or self-propelled vehicle which is provided with load transferring mechanism by means of which a load, such as one or more load boxes or containers, may be transferred between the mobile or self-propelled vehicle and a railway flat car or loading platform.

In the present application there is disclosed transportation means for handling interchangeable or detachable truck bodies whereby a truck body of any desired character, intended for handling any particular type of load, may be easily and quickly transferred from a mobile or self-propelled vehicle to a railway flat car and vice versa. This transportation means, therefore, is designed primarily for the handling of L. C. L. shipments of a size corresponding generally with the size or capacity of a conventional truck body, preferably of approximately five ton capacity.

A further object of the invention is to provide transportation means which is capable of transferring interchangeable truck bodies between a conventional truck chassis and a railway flat car or a loading platform.

A further object of the invention is to provide individual supporting means for the respective interchangeable truck bodies which will enable the bodies, depending upon the type of supporting means employed, to be end loaded or side loaded onto a flat car from the truck chassis.

A further object of the invention is to provide novel means for locking the interchangeable truck bodies onto a mobile or self-propelled vehicle or onto a railway flat car.

A still further object of the invention is to provide novel forms of skids or supports for interchangeable truck bodies which will enable the said bodies to be safely transported on any type of conveying means upon which the bodies may be mounted.

Another object of the invention is to provide a novel form of truck body supporting means which will enable a body to be discharged longitudinally from a conventional truck chassis onto a flat car with the truck body extending substantially at right angles to the flat car and to subsequently enable the truck body to be shifted relative to the flat car so that it will extend longitudinally of the latter, said novel truck body supporting means permitting side loading of the body onto a flat car or loading platform.

Other objects and advantages of the invention will be apparent during the course of the following description.

In the accompanying drawings forming a part of this specification and in which like numerals are employed to designate like parts throughout the same, Figure 1 is a top plan view of a mobile or self-propelled, dirigible vehicle and an interchangeable or detachable truck body being transferred between the mobile or self-propelled unit and a railway flat car.

Fig. 2 is a side elevational view of the structure shown in Fig. 1,

Fig. 3 is a similar view to Fig. 2, but discloses the detachable or interchangeable truck body, illustrated in Figs. 1 and 2, positioned upon the mobile or self-propelled vehicle and locked against accidental displacement therefrom, Fig. 4 is a rear elevational view of the transportation means disclosed in Fig. 3, Fig. 5 is an elevational view disclosing a detachable or interchangeable truck body after it has been transferred from a mobile or self-propelled vehicle to the body of a railway flat car, the transfer having taken place from the rear end of the mobile or self-propelled unit onto the railway flat car with the unit and car arranged at right angles to each other and with the said truck body still arranged transversely of the railway flat car, Fig. 6 discloses the base portion of the truck body illustrated in Fig. 5 after the truck has been moved into longitudinally alined position with respect to the railway flat car, Fig. 7 is a plan view of the base of the truck body illustrated in Figs. 5 and 6 shown rested upon a flat car with the said truck body illustrated in full lines in its final resting position with respect to the flat car and with the said truck body illustrated in dot and dash lines in its initial or partially loaded position with reference to the flat car, Fig. 8 is a detail vertical sectional view taken on line 8—8 of Fig. 6, Fig. 9 is a detail vertical sectional view taken on line 9—9 of Fig. 6, Fig. 10 is a detail, side elevational view of a form of truck body supporting skid embodying this invention, Fig. 11 is a detail transverse sectional view of the skid structure disclosed in Fig. 10, Fig. 12 is a similar view to Fig. 10 but illustrating a further modified form of truck body supporting skid, Fig. 13 is a detail transverse sectional view of the form of skid shown in Fig. 12 and with the skid, and a portion of the bottom of a truck body operatively associated with a portion of the mobile or self-propelled vehicle illustrated in Figs. 1 to 4 inclusive, Fig. 14 is a perspective view of a form of inflatable or fluid operated load lifting unit which is designed to be used as a portion of the load transferring mechanism associated with the mobile or self-propelled vehicle illustrated in Figs. 1 to 4 inclusive, Fig. 15 is a detail transverse sectional view of the unit disclosed in Fig. 14, and Figs. 16 and 17 are detail transverse sectional views of a modified form of inflatable lifting unit.

In the drawings, wherein for the purpose of illustration are shown preferred embodiments of this invention, the reference character A designates in its entirety a conventional truck chassis of the self-propelled, dirigible type. This truck chassis, of course, is provided with supporting wheels, axles, a chassis frame, an engine unit, and a driver's cab or compartment, all of conventional design and for that reason not specifically referred to or completely illustrated in detail.

Mounted upon the conventional truck chassis A is a load transferring unit which is designed to be retained as a permanent part of the truck A. This load transferring mechanism is disclosed in detail in my aforementioned application Ser. No. 674,785. Details of this mechanism, therefore, have not been disclosed in this application. The portions of the mechanism which have been disclosed, however, will be briefly described. The load transferring unit includes an auxiliary frame designated in its entirety by the reference character B. This unit B includes a load supporting platform made up of parallel rails 20 arranged at opposite sides of the frame and extending longitudinally of the truck chassis from the cab portion of the same to the rear end of the chassis. Figs. 1 to 4, inclusive, best illustrate this load platform construction. Arranged inwardly of the rails 20 of the platform and extending in parallelism therewith are guideways 21 adapted to support and guide longitudinally movable, fluid pressure or inflatable bag units 22. There are four of these units provided and they are arranged in longitudinally related pairs. All of these inflatable bag units 22 are connected at their inner ends to a manifold block 23. This manifold block is capable of movement longitudinally of the auxiliary frame unit B from the position illustrated in Fig. 1 to a position at the rear end of the said auxiliary frame. Fluid cylinder and piston units 24 are mounted upon the auxiliary frame B, as best illustrated in Fig. 1, and these units have their piston rods 25 connected to the manifold block 23. By admitting any type of fluid under pressure into the cylinders 24 at opposite ends of the pistons, not shown, arranged within the cylinders and connected to the rods 25, the manifold block 23 and all of the inflatable units 22 may be moved longitudinally in opposite directions of the auxiliary frame B. A supply conduit 26 is employed for admitting fluid under pressure to either or both pairs of inflatable units 22. When these units are inflated they are capable of elevating a load positioned over the same to lift the load from the rails 20 of the platform portion of the auxiliary frame. Fig. 2 discloses the rear pair of these inflatable bag units 22 as being inflated.

Figs. 1 to 4 inclusive disclose one form of interchangeable truck body which is capable of being transferred between the platform rails 20 of the auxiliary truck frame B and a railway flat car C. While this interchangeable truck body, designated in its entirety by the reference character D, is illustrated as taking the form of a rack type of body, it is to be understood that any other desired form of truck body might be used in lieu of this rack body. Said body D is shown as being mounted upon solid, longitudinally extending skids 27. At one end, each of these skids 27 is provided with a caster or roller 28, which functions to facilitate longitudinal movement of the truck body onto and off of a railway flat car, loading platform, or the like. With this type of continuous skid, the truck body D can only be loaded onto a flat car, from the truck, by endwise movement of the truck body with respect to the flat car. In other words, this truck body form of skid is only designed for end loading purposes. Figs. 1 and 2 illustrate the truck body D as being partially transferred from the mobile or self-propelled vehicle onto the railway flat car. This movement of the truck body has been accomplished by inflating all of the units 22, when the truck body is arranged as illustrated in Fig. 3 entirely superimposed with respect to the truck, and then moving all of the inflatable units longitudinally rearwardly of the truck chassis. The range of movement of these inflatable units will permit the truck body to be transferred from the position illustrated in Fig. 3 to the position illustrated in Figs. 1 and 2. The inflatable lifting units or bags 22 then should be deflated to permit them to be moved or retracted into their normal positions on the auxiliary frame B of the truck, or into the position illustrated in Fig. 1. The rear pair of inflatable units 22 then should be inflated, as illustrated in Fig. 2, to lift the truck body off of the platform rails 20 whereupon the longitudinal rearward movement of the inflatable units is repeated to entirely transfer the truck body onto the flat car. The rollers or casters 28 function to permit easy movement of the portion of the truck body which rests upon the top of the flat car during this final transferring of the truck body to the flat car. My previously referred to application Ser. No. 674,785 very completely illustrates the manner in which the inflatable units are manipulated to transfer a load from a mobile or self-propelled vehicle to a flat car or the like.

For the purpose of enabling the truck body D to be securely locked upon the auxiliary truck frame B or upon a flat car C, the truck body is provided at each of its four corners with a threaded shaft 29. These threaded shafts are suitably supported in end bearings 30 and are capable of being rotated in any desired manner. A specific mechanism for rotating these shafts will be described in connection with the structure disclosed in Figs. 5 and 6. Mounted for movement along these shafts are internally threaded blocks or nuts 31. A section of link chain 32 is connected at one end, by means of an eye 33. The eye is mounted upon a loose ring 34 carried by the block or nut 31. This loose ring also is provided with a hook 35 which is adapted to receive any one of the links of the chain 32. The free extremity of the chain has connected thereto a spring unit 36 which is connected at its outer end to a hook 37. Figs. 3 and 4 disclose this hook 37 as being engaged under the longitudinal side edge of the auxiliary truck frame B. The operating portion of the chain has been reduced in length by mounting one of the intermediate links of the chain on the hook 35 carried by the ring 34. By actuating the various threaded shafts 29, the blocks or nuts 31 may be moved longitudinally of the shafts to tension the operating portions of the chains, the springs 36, and the hooks 37 whereby the truck body will be securely locked upon the auxiliary truck frame B. It is to be understood that when this truck body is loaded onto a flat car, the same form of locking mechanism may be employed for securely fastening the body to the flat car by merely engaging the hooks 37 into suitable stake straps 38 mounted on the sides of the flat car. For the purpose of holding the locking mechanism out of the way during transfer of the truck body D, the said body is provided with pins 39 with which the end hooks 37 of the chains may be engaged, as clearly illustrated in Figs. 1 and 2.

Figs. 5 to 9, inclusive, disclose a different form of truck body E. This truck body is entirely closed and for that reason resembles a furniture moving van type of body. Doors 40 are provided for the truck body to facilitate loading and unloading of the same with the individual articles intended to be packed therein. This truck body is provided with a modified form of skid structure. At each of the four corner portions of the truck body base 41 there is provided a rigid skid section 42 which extends longitudinally of the body.

The intermediate portion of this truck body E has associated therewith a turntable structure which will permit the truck body to be swung about its central vertical axis. While I have illustrated in the drawings one form of turntable structure which may be employed for accomplishing this desired result, it is to be understood that I do not intend to limit myself to the particular details illustrated. The turntable structure disclosed includes a pair of parallel skid sections 43 which are interconnected and braced by transverse bars 44. These bars and skids form a supporting frame. A king pin 45 which extends through the base or bottom 41 of the truck body and through the center transverse bracing bar 44 is employed for pivotally connecting the truck body to this supporting frame formed by the bars 44 and skids 43. Interposed between this supporting skid frame and the bottom surface of the truck body, and immovably secured to said truck body is a wear plate 46. At suitably spaced intervals, see Figs. 7 and 9, anti-friction balls 47 are interposed between the various bars 44 and the wear plate 46. Fig. 9 discloses in vertical section this form of anti-friction pivotal connection between the supporting skid frame and the truck body.

Fig. 8 discloses in detail a form of locking mechanism employed for securing the supporting skid frame of the turntable structure to a railway flat car or the like to permit the truck body to be pivoted with respect to this supporting skid frame. This locking mechanism includes an internally threaded tube or sleeve 48, one of which is associated with each end of each one of the skid sections 43. A threaded shaft 49 is adjustably arranged within the tube or sleeve 48 and is actuated by means of a head 50 having lever bar receiving apertures 51. An arm 52 is loosely mounted by means of a hub 53 on the threaded shaft 49. By engaging the four arms 52 of the four separate locking devices with the side edges of the flat car C, when this supporting skid frame has been properly arranged with respect to the flat car, the supporting skid frame may be locked against movement with respect to the flat car by rotating the threaded shafts 49 to tighten the arms 52 against the edges of the flat car.

Fig. 5 discloses the rear portion of the mobile or self-propelled unit A backed up to the side of a flat car C. The transfer mechanism of the unit A has been employed to move the truck body E from the platform portion of the auxiliary frame B, carried by the truck chassis onto the flat car C with the central turntable supporting structure for the truck body centered upon the flat car and locked against movement with respect to the same. In this positioning of the truck body, it extends transversely of the flat car. The four corners of this truck body E have associated therewith the same type of locking mechanism illustrated and described in connection with the truck body disclosed in Figs. 1 to 4 inclusive. The same reference characters, therefore, will be applied to the elements of these locking devices. Fig. 7 discloses in dot and dash lines the truck body arranged transversely of the flat car, or in the position illustrated in Fig. 5. By means of the locking mechanism, the attendants of the transportation unit or of the railway flat car may swing the truck body into its proper alined position with respect to the flat car without the use of any additional power units, or the like. By merely engaging the hooks 37 of two of the locking devices with stake straps of the flat car and by adjusting the movable nuts or blocks 31 to tighten up or draw up on the chains, the truck body may be swung from its dot and dash line position into its full line position. After the truck body has been shifted into alinement with the flat car body, the locking devices may be employed in the manner illustrated in Fig. 6 to lock the truck body onto the flat car.

Figs. 10 and 11 disclose a modified form of truck body supporting skid. This type of skid consists of a rubber bar or elongated block 54 which is suitably connected to a base 55 adapted to be secured to the bottom 56 of a truck body. Reinforcing and auxiliary load supporting side plates 57 are arranged on opposite sides of the rubber bar or block 54. These plates function to prevent complete collapse of the rubber bars or blocks under exceptionally heavy loads and will engage a supporting surface should the load supported by the blocks be sufficient to compress the rubber entirely into the space between these auxiliary plates.

Figs. 12 and 13 disclose a further modified form of vehicle body supporting skid. This form of skid includes an inflatable bag 58 of elongated formation which is reinforced against complete collapse under an excessive load and connected to a truck body floor 59 by means of a channel-shaped metallic rail 60.

It is to be understood that the resilient forms of skids shown in Figs. 10 to 13 inclusive will function to absorb shocks and jars which would be transmitted to the contents of the truck body during transit if non-yielding or rigid skids were employed. These resilient or yieldable skids also will facilitate feeding of a truck body into a relatively narrow space where the truck body is initially slightly disalined with respect to said narrow space. In other words, if the transporting vehicle is placed with its load supporting platform slightly out of alinement with a relatively narrow space intended to receive the truck body, the yieldable skids of Figs. 10 to 13 inclusive will enable the truck body to be forced slightly laterally in either direction during movement of the body off of the transporting vehicle onto the supporting surface intended to receive the same.

Figs. 13, 14 and 15 disclose in detail a specific form of inflatable bag which is intended for use as a part of a transfer mechanism of the transporting vehicle. This inflatable bag structure may be made of any desired laminated rubber or fabric combination and includes foldable side walls 61 having reentrant angles or folds 62 which are staggered vertically with respect to each other. It is to be understood that when this inflatable bag unit is entirely deflated or collapsed, the folds 62 will overlap and be superimposed, as illustrated in Fig. 13. When the bag is inflated, the side, foldable walls, will tend to straighten out and occupy vertical planes. Fig. 15 illustrates the relative movement of these staggered folds or reentrant angles during inflation.

Figs. 16 and 17 disclose in detail a further specific form of inflatable bag 63 to be used in the same manner as described in connection with the bag shown in Figs. 13 to 15 inclusive. This bag 63 has reentrant angles or folds formed in its side walls with a pair of complemental enlargements 64 formed on the inner side of each fold. The enlargements are provided with shoulders 65 which will engage to increase the ability of the side walls to resist internal pressure.

It is to be understood that the forms of this invention herewith shown and described are to be taken as preferred examples of the same and that various changes in the shape, size and arrangement of parts may be resorted to without departing from the spirit of the invention or the scope of the subjoined claims.

Having thus described the invention, I claim:

1. In combination, a truck chassis, a truck body, and means permanently mounted on said truck chassis and comprising a truck body supporting platform and fluid operated truck body loading and unloading mechanism including expansible and slidable members.

2. In combination, a truck chassis, a truck body, an auxiliary frame mounted on the chassis, said frame including spaced truck body supporting rails, and fluid operated truck body loading and unloading mechanism mounted on the auxiliary frame between said rails and including expansible and slidable members.

3. In combination, a truck chassis, a truck body, an auxiliary frame having a truck body supporting platform mounted on said chassis, and expansible members slidably mounted on said frame constructed and arranged to raise and lower a truck body with respect to the platform and to move the said body relatively onto and off of said platform.

4. In combination, a truck chassis, a truck body, an auxiliary frame mounted on the chassis, said frame including spaced truck body supporting rails, and fluid operated means mounted on the said frame and engageable with the bottom of a truck body for raising and lowering the body relative to the said rails and said truck chassis and for shifting the body longitudinally of the rails in either direction to load and unload the body relative to the rails.

5. A complete truck body adapted to be removably supported on a truck chassis, a loading platform, or a railway flat car and to be transferred readily between any of the same, said truck body comprising a load supporting bottom, and longitudinally extending skids arranged beneath said bottom for maintaining the same elevated to facilitate insertion and withdrawal of transferring mechanism, said skids each comprising a rubber bar and means for securing the bar to the truck body.

6. A complete truck body adapted to be removably supported on a truck chassis, a loading platform, or a railway flat car and to be transferred readily between any of the same, said truck body comprising a load supporting bottom, and longitudinally extending resilient skids arranged beneath said body for maintaining the same elevated to facilitate insertion and withdrawal of transfer mechanism.

7. A complete truck body adapted to be removably supported on a truck chassis, a loading platform, or a railway flat car and to be transferred readily between any of the same, said truck body comprising a load supporting bottom, and longitudinally extending inflatable bags constructed and arranged to form skids for maintaining the truck body elevated from a supporting surface and to absorb shocks while in transit.

8. A complete truck body adapted to be removably supported on a truck chassis, a loading platform, or a railway flat car and to be transferred readily between any of the same, said truck body comprising a load supporting bottom, and longitudinally extending inflatable bags constructed and arranged to form skids for maintaining the truck body elevated from a supporting surface and to absorb shocks while in transit, and rigid reinforcing and auxiliary load supporting plates associated with said bags to support the truck body in case of failure of said bags.

9. A complete truck body adapted to be removably supported on a truck chassis, a loading platform, or a railway flat car and to be transferred readily between any of the same, said truck body comprising a load supporting bottom, rubber bars secured to said truck body constructed and arranged to act as skids, and rigid reinforcing and auxiliary load supporting plates extending longitudinally of said bars to support the truck body in case of overloading the bars.

10. A complete truck body adapted to be removably supported on a truck chassis, a loading platform, or a railway flat car and to be transferred readily between any of the same, said truck body comprising a load supporting surface, a turntable device carried by said truck body to permit turning of the body while resting on a supporting surface, and manually operable power multiplying means carried by the body for use in turning the latter.

11. A complete truck body adapted to be removably supported on a truck chassis, a loading platform, or a railway flat car and to be transferred readily between any of the same, said truck body comprising a load supporting surface, a turntable device carried by said truck body to permit turning of the body while resting on a supporting surface, said turntable device including skids adapted to rest upon a supporting surface while the body is being turned, and mechanical power multiplying means carried by said body for use in turning the latter.

12. A complete truck body adapted to be removably supported on a truck chassis, a loading platform, or a railway flat car and to be transferred readily between any of the same, said truck body comprising a load supporting surface, and a turntable device carried by said truck body to permit turning of the body while resting on a supporting surface, said turntable device including skids adapted to rest upon a supporting surface while the body is being turned, and means for locking said skids to the supporting surface to prevent movement of the same during turning of the truck body.

13. A complete truck body adapted to be removably supported on a truck chassis, a loading platform, or a railway flat car and to be transferred readily between any of the same, said truck body having a load supporting space, two parallel series of skid sections arranged beneath said body to support the same elevated for the insertion of transfer mechanism beneath the body, and means for pivotally connecting one skid of each series to the body to permit turning of the body relative to a supporting structure on which the last-mentioned skids rest.

14. A complete truck body adapted to be removably supported on a truck chassis, a loading platform, or a railway flat car and to be transferred readily between any of the same, said truck body comprising a load supporting surface, and a turntable device carried by said truck body to permit side loading of the body onto a railway flat car, and means carried by the truck body and connectible to a flat car for swinging the body on said turntable device.

15. A complete truck body adapted to be removably supported on a truck chassis, a loading platform, or a railway flat car and to be transferred readily between any of the same, said truck body comprising a load supporting surface, and a turntable device carried by said truck body to permit side loading of the body onto a railway flat car, and means carried by the truck body and connectible to a flat car for swinging the body on said turntable device from a position extending transversely of the flat car to a position extending longitudinally thereof and for locking said body in said longitudinal position.

16. In a self-propelled vehicle having fluid pressure operated mechanism for raising and lowering a load container and for moving a container onto and off of the vehicle, the improvement which comprises an elongated expansible tube having foldable side walls adapted to be moved toward vertical planes, and enlargements formed on the folds in opposed side walls for increasing the ability of said walls to resist internal pressure.

NELSON A. LUDINGTON.